United States Patent
Cedar et al.

(10) Patent No.: US 6,256,650 B1
(45) Date of Patent: Jul. 3, 2001

(54) METHOD AND SYSTEM FOR AUTOMATICALLY CAUSING EDITABLE TEXT TO SUBSTANTIALLY OCCUPY A TEXT FRAME

(75) Inventors: Cy Anne Cedar, Redmond; Matthew Paul Rhoten, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/080,709

(22) Filed: May 18, 1998

(51) Int. Cl.$^7$ .................................................. G06F 17/21

(52) U.S. Cl. ............................................. 707/517; 707/530

(58) Field of Search ................................... 707/517, 518, 707/519, 520, 521, 526, 530; 345/127, 128, 129, 130, 131, 471, 472

(56) References Cited

U.S. PATENT DOCUMENTS

| | | | |
|---|---|---|---|
| 4,712,102 | * 12/1987 | Troupes et al. | 345/194 |
| 5,001,697 | * 3/1991 | Torres | 345/439 |
| 5,227,772 | * 7/1993 | Takebe | 345/128 |
| 5,233,334 | * 8/1993 | Takebe et al. | 345/128 |
| 5,724,073 | * 3/1998 | Hino et al. | 345/441 |
| 5,754,873 | * 5/1998 | Nolan | 707/527 |

FOREIGN PATENT DOCUMENTS 5-135034 * 6/1993 (JP).

OTHER PUBLICATIONS

McClelland, Deke. "Graphics' Great Leap." Macworld, Mar. 1996. p. 106.*

"Choosing Fit Headline Doesn't Center Text in Illustrator 5.x." Adobe Support Database Document 310080, last update Oct. 4, 1995. Found at www.adobe.com.*

* cited by examiner

Primary Examiner—Stephen S. Hong
(74) Attorney, Agent, or Firm—Kilpatrick Stockton LLP

(57) ABSTRACT

A method and system for causing editable text to substantially occupy an associated text frame. The system and method operate in a standard text editing environment of a text editing application program. The height of the editable text is altered, without the need for user interaction, directly in the standard text editing environment.

A fullness ratio is determined, which may be defined as a ratio of the height of the editable text to the height of the text frame. If the fullness ratio is not within a predetermined range of values, the height of the editable text will be altered. An ideal height for the editable text is determined that will cause the fullness ratio to be within the predetermined range of values. The ideal height is a function of the font size of the characters that make up the editable text. So, an ideal font size must be determined, that when applied to the editable text, will cause the fullness ratio to be within the predetermined range of values.

To determine the ideal font size, a theoretical font size is determined. The theoretical font size may be described as a "best guess" at the ideal font size. The theoretical font size is applied to the editable text and the fullness ratio is again determined. If the fullness ratio is not within the predetermined range, another theoretical font size is determined and the method is repeated. When the fullness ratio is determined to be within the predetermined range, the theoretical font size is considered to be the ideal font size. The ideal font size is applied to the editable text, causing the editable text to substantially occupy the text frame.

26 Claims, 7 Drawing Sheets

METHOD AND SYSTEM FOR AUTOMATICALLY CAUSING EDITABLE TEXT TO SUBSTANTIALLY OCCUPY A TEXT FRAME

TECHNICAL FIELD

The present invention generally relates to methods and systems applicable to word processing software, and in particular, to desktop publishing software. More particularly, the present invention relates to the creation of images and documents through the use of frame-based design elements, including text frames for the input of text therein. Even more particularly, the present invention relates to automated methods and systems for causing editable text to substantially occupy a text frame so as to present an aesthetically pleasing appearance.

BACKGROUND OF THE INVENTION

In today's media age, more and more people are beginning to use personal computers, rather than a professional printing service, to produce high-quality publications and other previously professionally designed documents. Current desktop publishing software automates a large part of the process involved in the creation of professional-quality publications. Desktop publishing software typically includes templates of professionally designed publications, ranging from newsletters to web-sites to greeting cards. Customized publications may be created from these templates by inserting text, graphics, and other multimedia applications into the designated or appropriate places in the templates. Publications can also be created from scratch by reserving areas for element types, such as text, and filling those areas with content. These locations in the templates for the input of text are referred to herein as text frames, and they are also commonly known as input fields, text boxes, and parameters.

The process of adjusting text in a text frame, such that the text generally fits in an acceptable manner within the text frame, is referred to as copyfitting. A problem associated with copyfitting is that the area or space of the text frame that is reserved for input of the text generally should not be altered until other design options have been eliminated. In particular, the area of the text frame usually cannot be changed without also affecting the original document template design. Typically, efforts are made to avoid changing a document to accommodate a single element, because such change may negatively affect the aesthetic appeal of the overall design. But more seriously, such change may cause an automated template design to be inoperative. Other problems also may result from changes to the original document design.

If the area of a text frame cannot be changed to accommodate text for input therein, then other steps may be taken to copyfit the text into the text frame. For example, text that is to be input into a text frame may be larger than the space provided in the text frame. This is referred to as an overflow problem or simply as overflow. Two options are typically available to ameliorate the overflow problem. On the one hand, the size of the text may be decreased to fit the text frame. On the other hand, the text frame may be enlarged to fit the text. As noted above, this second option is generally avoided because changing the size of a text frame may negatively affect the original template document design. As another example, text that is to be input into a text frame may be small compared to the space provided in the text frame. This is referred to as an underflow problem or simply as underflow. As with the overflow problem, two options are typically available to ameliorate the underflow problem. On the one hand, the size of the text may be increased to fit the text frame. On the other hand, the text frame may be decreased to fit the text. As noted above, this second option is generally avoided because changing the size of a text frame may negatively affect the original document design. Thus, typical desktop publishing software attempts to ameliorate overflow or underflow problems by allowing for the size of the text to be increased or decreased, respectively, so that the text is better accommodated in a text frame.

Generally, desktop software allows for the adjustment of text size in copyfitting by allowing a user to adjust the text size so that it fits better in a text frame. To adjust the text size, the user provides keyboard or other input through the computer system so that the size of the text changes. This type of user input is referred to herein as manual input because the user manually (or through some other process) provides information to the desktop publishing software that the size of the editable text is to be changed. Further, the user must provide additional input as to the new size to which the editable text is to be changed. After the user provides this input, the desktop publishing software causes the text to change to the new size. The text in its new size typically is then displayed on a computer screen so that the user may see the effect of the change in size of the text. If the user is still dissatisfied with the size of the text relative to the text frame, the user may repeat the manual input process until an acceptable size is reached. An example of a manual input copyfitting system is embodied in a software package called "Home Publisher Version 2.1" by Adobe Systems Incorporated of San Jose, Calif.

A goal of desktop publishing software is to automate the creation of a publication as much as possible for the user. Thus, it is counterproductive to require the user of the software to provide manual input so as to alter the text size. Moreover, it is even more counterproductive to require the user to have to repeat a manual input process and to keep repeating the process until some acceptable size is reached.

The counterproductivity and other problems with manual input in copyfitting have been recognized and attempts have been made to solve these problems through the provision of automatic copyfitting. Generally, automatic or automated copyfitting requires little if any manual input from a user. A particular method of automatic copyfitting converts the editable text into a bitmap image. This bitmap image may be scaled up or down to cause the bitmap image to fit into the space of a text frame. To increase the size of a character of text, the bitmap image of the character is scaled by a desired percentage. The enlarged bitmap image, however, has a poor aesthetic quality due to aliasing. Aliasing is a problem common to bitmaps. As an alternative, the bitmap image may be created in a size that is much larger than the desired enlarged text size. Then the bitmap image is scaled down to reach the desired enlarged text size. Although this alternative may be relatively effective to avoid aliasing, the alternative solution requires a lot of processing in that at least three generally complicated methods must be carried out in this alternative. In other words, the bitmap image must first be created, the bitmap image must then be enlarged, and finally, the bitmap image must be scaled down to the appropriate size. This much processing often renders this alternative an impractical solution to the problems of copyfitting.

Another particular method of automatic copyfitting is incorporated as a feature in the "WORDART" software produced and distributed by Microsoft Corporation of Redmond, Wash. Similar to the bitmap image mentioned above, "WORDART" converts the text into images that represent outlines of the characters. "WORDART" takes advantage of the fact that editable text fonts are a collection of curves. These curves may be described by equations and encoded in a computer's memory. "WORDART" retrieves these equations from the API of the operating system, constructs outlined images of the text, and scales the outlined images to a desired text size. Then, the scaled outlined images are rasterized to the best available resolution for display on the computer screen.

The method employed by "WORDART" produces images of better quality than does the method relating to the bitmap image. But the method employed by "WordArt" shares a drawback with the method of the bitmap image. The method employed by "WORDART" involves a high degree of complexity and requires a lot of processing. A high degree of processing may render the method employed by the "WORDART" software an impractical solution to the problems of copyfitting.

In addition, both the bitmap image method and the method employed by "WORDART" pose additional problems such as user interface problems. In particular, as noted, both methods provide the text to the user as an image. When the text is provided as a bitmap or an outlined image, the text may not be edited through the use of a standard text editing mode. Furthermore, a body of text containing multiple lines requires the user to manually add breaks between lines, instead of the common occurrence of automatic linebreaking. If any changes to the text, or to the breaks between characters in the text, are desired, a special and distinct text editing mode must be invoked that will allow the user to edit the image. In other words, the user is required to switch back and forth between a standard text editing mode to edit editable text and a special text editing mode to edit the bitmap or outlined image of the text. Such back and forth switching is tedious and irritating to most users. In addition, the requirement of switching back and forth between two different text editing modes engenders other problems. For example, in the method employed by "WORDART", the outlined image has nearly the same appearance as the editable text. Users often become confused as to which of the two different editing modes is applicable in any particular editing situation. Further, users often become frustrated by having to learn and choose between two different text editing techniques. Thus, the bitmap image method and the method used by "WordArt" share the problem of processing complexity and user interface problems related to the use of different text editing modes depending upon the state of the text in the copyfitting process.

Still another method of automatic copyfitting is referred to as a page-level (or document-level) shrink-to-fit method. As the names imply, this method does not directly manipulate the size of editable text. Rather, the size of the entire page or document is altered, so as to reduce the number of pages in a printed document. By way of illustration, a user may instruct a text editing program to scale a document containing 1.25 pages down to a 1 page document. This scaling process has the necessary effect of enlarging or reducing the size of the text included within the document. This shrink-to-fit method is generally undesirable in desktop publishing because such a method alters the predetermined scale of the professionally designed elements in a document.

Yet another method of automatic copyfitting is referred to as font size manipulation in a controlled editing environment. By this method, the user is restricted from using full editing capabilities, so that the effects of homogeneous font size changes can be cleanly calculated. This method actually alters the size of the text without the need to convert it to an image. However, the user is forced to edit the text in a special controlled editing mode. In order to view the text, the user must switch to the standard text editing mode. After viewing, if the user determines the changes were insufficient, then the user switches to the special controlled editing mode to do the editing. Then, after editing, the user must switch again to the standard text editing mode in order to view the text. Thus, the user is denied the convenience of immediate feedback, which is provided when editable text is edited in a standard text editing mode. The user is also inconvenienced by the necessity of having to switch back and forth between editing and viewing. Copyfitting methods of this type also typically restrict the user from having a variety of colors, font faces, and other properties in a body of text.

An example of font size manipulation in a controlled editing environment is incorporated in a software package called "iPublish 2.0" by Design Intelligence, Inc. of Seattle, Wash. This method involves detecting when there is too much text to fit in a text frame, and automatically reducing the size of the text to fit in the frame. This method prevents the user from ever changing the size of a text frame, regardless of how much text is desired. This method does not allow a body of text to have more than one color, font face or font size. This method also tends to leave text in an underflow condition, where text does not substantially fill the space in a text frame.

Therefore, the problem of copyfitting when the space in a text frame cannot be altered has not been adequately addressed by the methods of automatic copyfitting discussed above. All of these methods have drawbacks that cause them to be less than desirable for use in high quality automated desktop publishing software. In addition to the drawbacks mentioned above, many of these methods require the user to perform extra steps to accomplish the copyfitting. For example, a user may have to provide manual input such as the use of pull down menus or other tools in order to reach or initiate a copyfitting feature of the desktop publishing software which would aid in the copyfitting process, such as a text size control. The text may need to be rewritten to accommodate the automatic copyfitting method. Further steps may be necessary to work through the copyfitting procedures. This required user-interaction takes time to learn and to execute. In addition, this required user-interaction belies the supposedly automatic nature of automatic copyfitting features of the methods discussed above.

Thus, there remains a need for automated copyfitting that is capable of fitting editable text into a text frame so that the editable text substantially occupies the text frame without overflow or underflow, and that involves only a single text editing mode for all text editing operations.

There also remains a need for automated copyfitting that adjusts the size of editable text in a text frame so that it is aesthetically acceptable and carries out such adjustment without the need for manual input or any other type of interaction from the user.

There further remains a need for automated copyfitting that adjusts the size of editable text in a text frame without prohibiting frame resizing or the usage of mixed text properties such as color, font face and font size.

SUMMARY

The present invention meets the needs in the art by providing a method and system for automated copyfitting, so as to cause editable text to substantially occupy a text frame of a given dimension. An exemplary embodiment of the present invention causes a dimension of the editable text to be altered in response to the editable text being input into the text frame, or in response to changes in the properties of the editable text, such as the choice of a different font face. Thus, there is no need for user interaction to affect the change in dimension of the editable text. The exemplary embodiment operates in a standard text editing environment of a text editing application. The method and system are able to change the dimension of the editable text without departing from the standard text editing environment.

The exemplary embodiment of the present invention causes an ideal dimension of the editable text to be determined. The ideal dimension is defined as being a within a predetermined range of percentages of the fixed dimension of the text frame. An initial dimension of the editable text is then changed to the ideal dimension, so that the editable text is caused to substantially occupy the text frame. The initial dimension of the editable text is defined by an initial font size and the initial dimension of the editable text is changed to the ideal dimension by changing the initial font size to an ideal font size. More particularly, the editable text comprises characters, which have an initial font size. The initial dimension of the editable text is thus a function of the dimensions of the characters. Those skilled in the art will contemplate expansion of the exemplary embodiment to manipulate other properties of text, such as character width and line height. These other manipulations are within the scope of the present invention.

In the exemplary embodiment, the ideal dimension is determined by first determining a theoretical font size for the characters that make up the editable text. The theoretical font size is a "best guess" at the ideal font size. After a theoretical font size is determined, the initial font size of the characters is changed to the theoretical font size. Based on the theoretical font size, the exemplary system and method determine a theoretical dimension for the editable text. A theoretical fullness ratio is then calculated, which is defined as a ratio of the theoretical dimension of the editable text compared to the fixed dimension of the text frame. If it is determined that the theoretical fullness ratio is within a predetermined range of values, the theoretical font size is considered to be the ideal font size.

In an exemplary embodiment, the height of the editable text is changed to make the editable text substantially occupy a text frame. The exemplary embodiment loops through calculations of a fullness ratio and a theoretical font size to determine an ideal font size such that the editable text will substantially occupy an associated text frame. The fullness ratio is calculated as the resize height of the text frame, defined as the height of the text frame which would be required to make the text just fit, divided by the actual height of the text frame. Based on the fullness ratio of the text frame, a theoretical font size is calculated. The theoretical font size may be described as a best guess at the ideal font size. In an attempt to determine a theoretical font size that closely approximates the ideal font size, a linear font size is first calculated using a linear equation. However, due to line wraps, resizing the editable text to this linear font size may actually cause the editable text to overflow the text frame. Thus, a quadratic font size is calculated using a quadratic equation. The ideal font size that allows the editable text to substantially occupy the text frame without overflow generally lies somewhere between the linear and quadratic font sizes, which are used as initial maximum and minimum allowed font sizes, respectively.

If there are more than thirty characters on any line of all lines of the editable text, the theoretical font size is set equal to the quadratic font size. If there are fewer than thirty characters on each of all of the lines of text, the theoretical font size is calculated by interpolating between the linear font size and the quadratic font size. The fullness ratio of the text frame is then recalculated based on the theoretical font size. If the fullness ratio does not fall within a predetermined range of values, the copyfitting loop is repeated until the ideal font size is determined.

After each incorrect determination of a theoretical font size, the maximum and minimum allowed font sizes are reset, so that the system can quickly determine the ideal font size. For example, if the theoretical font size is smaller than the maximum allowed font size, but still results in overflow, the theoretical font size becomes the new maximum allowed font size and no subsequent theoretical font sizes larger than the new maximum value are accepted. If a subsequent theoretical font size falls outside the range defined by the maximum and minimum allowed font sizes, the theoretical font size is simply replaced by a halfway font size that is halfway between the maximum and minimum allowed font sizes, and the copy fitting loop is terminated. Also, for theoretical font sizes that fall within the range defined by the maximum and minimum allowed font sizes, the copy fitting loop includes additional time conserving features. As an example, the loop includes an iteration counter having a preset limit. When the preset limit on the number of loop iterations is exceeded, the next theoretical font size that does not result in overflow is assumed to be the ideal font size and the loop is terminated.

DETAILED DESCRIPTION

Referring now to the drawing figures, in which like numerals indicate like elements or steps throughout the several views, the exemplary embodiment of the present invention will be described.

Generally, the present invention provides a system and method for causing editable text to substantially occupy an associated text frame. A text frame is displayed on a computer screen and editable text is input into the text frame. Responsive to the input of the editable text and without the need for user interaction, the present invention causes the dimensions of the editable text to be changed to the ideal dimensions of the editable text. The ideal dimensions of the editable text may broadly be defined as being the dimensions that are within a predetermined range of percentages of the dimensions of the text frame. In the exemplary embodiment, the range of ideal dimensions of the editable text is 95% to 100%, inclusively, of the dimensions of the text frame.

The dimensions of the editable text and the text frame are contemplated as including all geometric dimensions, such as height, width, and depth. The exemplary embodiment of the present invention focuses on determining an ideal height for the editable text. The ideal height is predetermined in the exemplary embodiment to be 95% –100%, inclusively, of the height of the text frame. Stated another way, the exemplary embodiment determines a fullness ratio, which is defined herein as a ratio of the height of the editable text to the height of the text frame. The height of the editable text is altered until the fullness ratio is within a predetermined range of values. In the exemplary embodiment, the predetermined range of values of 0.95–1.0, inclusively.

Figure 1:
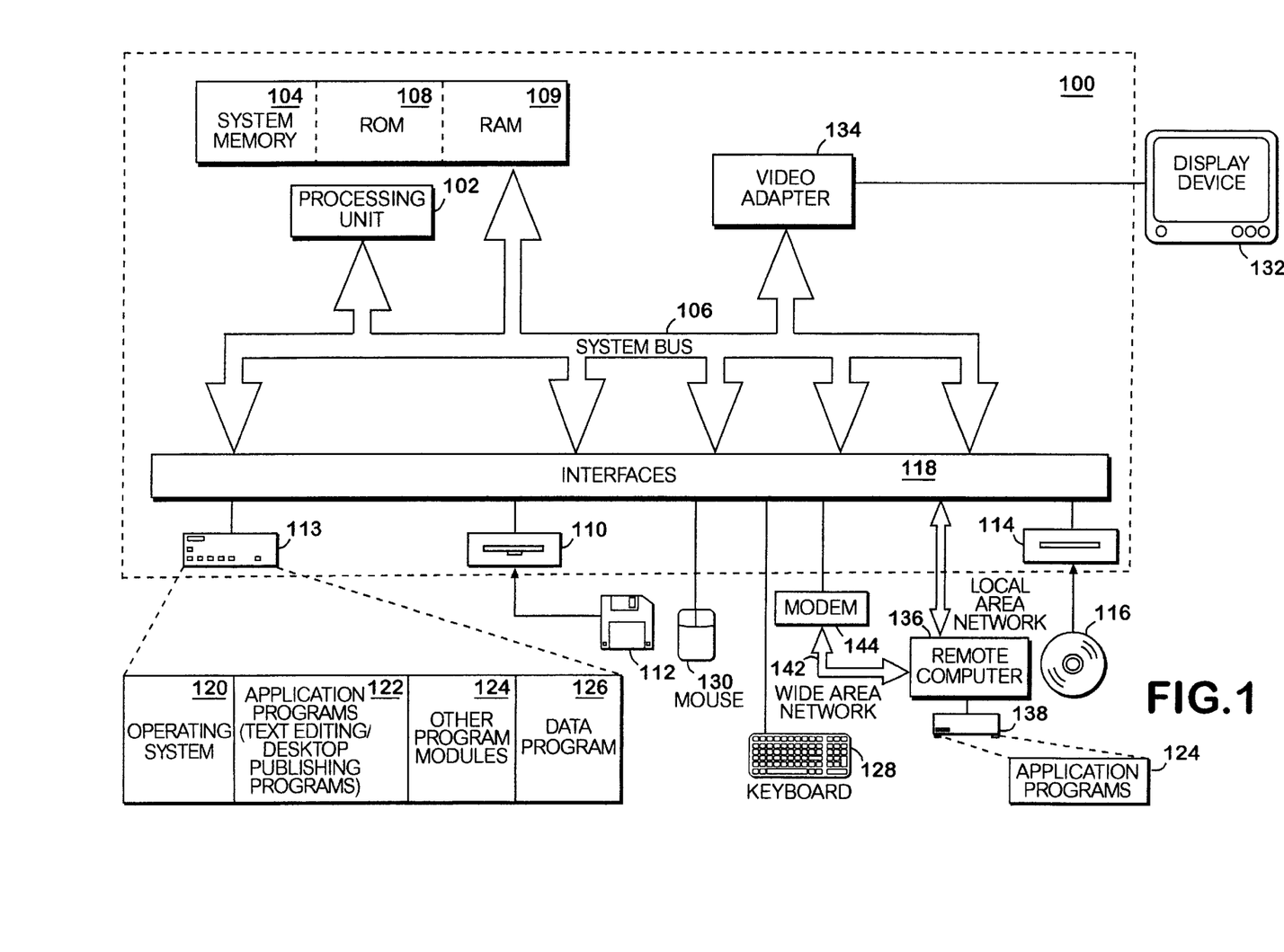
FIG. 1 is a functional block diagram of a computer system that provides the operating environment for the exemplary embodiments of the invention.

For a single line of editable text, the height of the editable text is a function of the height of the characters that make up the editable text. As used herein, the term characters is intended to refer to all linguistic or other communicative symbols, such as alpha-numeric characters, that may be created with any well known input device. Well known input devices include a keyboard 128 or a mouse 130 (FIG. 1). The height of the characters may be defined by a font size. However, when the editable text comprises two or more lines of editable text, the height of the editable text is a function of font size multiplied by the number of lines of editable text, plus the size of the space between the lines of the editable text. Thus, the height of the editable text may be broadly defined as the vertical space occupied by the editable text. The term vertical space is used in its commonly understood meaning with respect to a dimension from top to bottom of a computer screen.

The exemplary embodiment alters the initial height of the editable text by altering the initial font size of the characters and symbols making up the editable text. Changing the font size of editable text causes unpredictable changes in the height of the editable text due to unpredictable line wraps. Line wraps occur when a number of characters and symbols is too large to fit on a single line. Thus, the exemplary embodiment iterates through calculations of "theoretical" font sizes, until an ideal font size is determined that will cause the height of the editable text to be within a predetermined range of values.

The exemplary embodiment of the present invention may be advantageously incorporated into desktop publishing software. Desktop publishing software typically presents a screen display that includes several text frames of fixed dimensions. A text frame, which is sometimes referred to as a text box, is typically a polygonal graphic object that is displayed on a display device for the purpose of surrounding and enclosing text. A text frame may be of any shape or size, and in fact the entire screen of a display device may be considered a large rectangular text frame.

The screen display presented by a desktop publishing system represents a template framework for a publication document, such as a newsletter, a greeting card, a poster, etc. The user may add graphics to the template framework and input editable text into the text frames, so as to construct a professional looking publication document. As the user inputs editable text into the text frames, it will often be the case that the size of the editable text appears to be too large or too small, relative to the text frame. When this occurs, the aesthetic quality of the publication document is diminished.

Thus, the present invention provides a method and system for automatically altering the size of editable text such that the editable text substantially occupies an associated text frame. In the resulting publication document, the text frame appears as if it were designed specifically to fit the dimensions of the editable text, and vice versa. In the exemplary embodiment, the system and method are configured to ensure that the altered editable text will not overflow the text frame. The method and system, however, may also be configured so that the altered editable text may be determined to substantially occupy the text frame even if overflow occurs.

Herein, reference is made to "editable text". Editable text is contemplated as text that is editable in a standard text editing mode, such as that found in common word processing applications. More specifically, a standard text editing mode is contemplated as being synonymous with a "live" text editing mode, in which a user may modify the editable text that appears on the display device, while simultaneously watching the modifications occur on the display device. In contrast, as explained in the background, other systems and methods typically have to convert editable text to an alternate form which requires a distinct editing mode as opposed to a standard text editing mode in order to accomplish resizing of the text in a text frame. The present invention allows the size of editable text to be directly altered in the standard text editing mode, without having to convert the editable text to an alternate form and subsequently edit the converted text in an editing mode other than the standard editing mode. Furthermore, the present invention supports rich text formatting. Rich formatting allows the user to change the properties of text, character by character, such as color, font face, font size, etc. Thus, by supporting rich text formatting, the present invention is able to copyfit text that has mixed colors such as blue and green, mixed font faces such as Times New Roman and Arial, and mixed line spacing, etc. By operation of the exemplary embodiment, the standard text editing mode need not be changed. Advantageously, as a result, the user retains the full range of editing features of the standard text editing mode with respect to input editable text.

In order to resize editable text, without converting the editable text to an alternate form, the exemplary embodiment manipulates the height of the editable text in the standard text editing mode. Typically, an application supporting a standard text editing mode offers the user the capability to manually alter the font size of a selected block of editable text. The exemplary embodiment, however, provides an automated system for altering the font size of editable text. In the exemplary embodiment, when the exemplary embodiment is incorporated into a desktop publishing application or any other appropriate application, the user may activate automated copyfitting by selecting the option from a pull-down menu, filling in a check box, or through any other well known selection means. Thus, once the automated copyfitting option is activated, all editable text is automatically resized to optimally fit the respective text frames, without the need for user interaction. Alternatively, the exemplary embodiment may be preset or otherwise activated to come into use with a desktop publishing application or other appropriate application without interaction from the user.

The exemplary embodiment may be referred to as a copyfitting loop. In essence, the exemplary embodiment loops through calculations of a "fullness ratio" and a "theoretical font size" to determine an ideal font size such that the height of editable text fills a text frame to a predetermined fullness level, also referred to as a desired fullness ratio, a desired fullness, or an ideal fullness ratio. In the exemplary embodiment, this predetermined fullness level is between 95% to 100%. However, other implementations can be configured to support any particular predetermined fullness level, so as to achieve a particular effect for a particular publication. Advantageously, the exemplary embodiment also provides iteration minimization features so as to ensure that the ideal font size is determined with speed and efficiency.

Overview of the Environment

FIG. 1 and the following discussion are intended to provide a brief, general description of a suitable computing environment in which the present invention may be implemented. The invention is described in the general context of a text editing application program module that runs on an operating system in conjunction with a personal computer. Those skilled in the art will recognize that the invention also may be implemented in combination with other program modules. Generally, program modules include routines, programs, components, data structures, etc. that perform particular tasks or implement particular abstract data types.

Moreover, those skilled in the art will appreciate that the invention may be practiced with other computer system configurations, including hand-held devices, multiprocessor systems, microprocessorbased or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 100, including a processing unit 102, a system memory 104, and a system bus 106 that couples the system memory to the processing unit 102. The system memory 104 includes read only memory (ROM) 108 and random access memory (RAM) 109. The personal computer 100 further includes a hard disk drive 113, a magnetic disk drive 110, e.g., to read from or write to a removable disk 112, and an optical disk drive 114, e.g., for reading a CD-ROM disk 116 or to read from or write to other optical media. The hard disk drive 113, magnetic disk drive 110, and optical disk drive 114 are connected to the system bus 106 by interfaces 118. The drives and their associated computer-readable media provide nonvolatile storage for the personal computer 100. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives 110, 113, 114 and RAM 109. Particularly, application programs 122 may include text editing software or desktop publication software, that may be specifically configured for the exemplary embodiment of the present invention. Application programs are executed by the operating system 120, in conjunction with the processing unit 102.

A user may enter commands and information into the personal computer 100 through a keyboard 128 and pointing device, such as a mouse 130. Other input devices (not shown) may include a microphone, joystick, game pad, satellite dish, scanner, or the like. These and other input devices are often connected to the processing unit via interfaces 118 that are coupled to the system bus. A display device 132 or other type of video output device is also connected to the system bus 106 via an interface, such as a video adapter 134. In addition to the display device 132, personal computers typically include other peripheral output devices (not shown), such as speakers or printers.

The personal computer 100 may operate in a networked environment using logical connections to one or more remote computers, such as a remote computer 136. The remote computer 136 may be a server, a router, a peer device or other common network node, and typically includes many or all of the elements described relative to the personal computer 100, although only a memory storage device 138 has been illustrated in FIG. 1. The logical connections depicted in FIG. 1 include a local area network (LAN) 140 and a wide area network (WAN) 142. Such networking environments are commonplace in offices, enterprise-wide computer networks, intranets and the Internet.

When used in a LAN networking environment, the personal computer 100 is connected to the LAN 140 through the interfaces 118. When used in a WAN networking environment, the personal computer 100 typically includes a modem 144 or other means for establishing communications over the WAN 142, such as the Internet. The modem 144, which may be internal or external, is connected to the system bus 106 via interfaces 118. In a networked environment, program modules depicted relative to the personal computer 100, or portions thereof, may be stored in the remote memory storage device. It will be appreciated that the network connections shown are exemplary and other means of establishing a communications link between the computers may be used.

Operation of an Exemplary Embodiment

Figure 2:
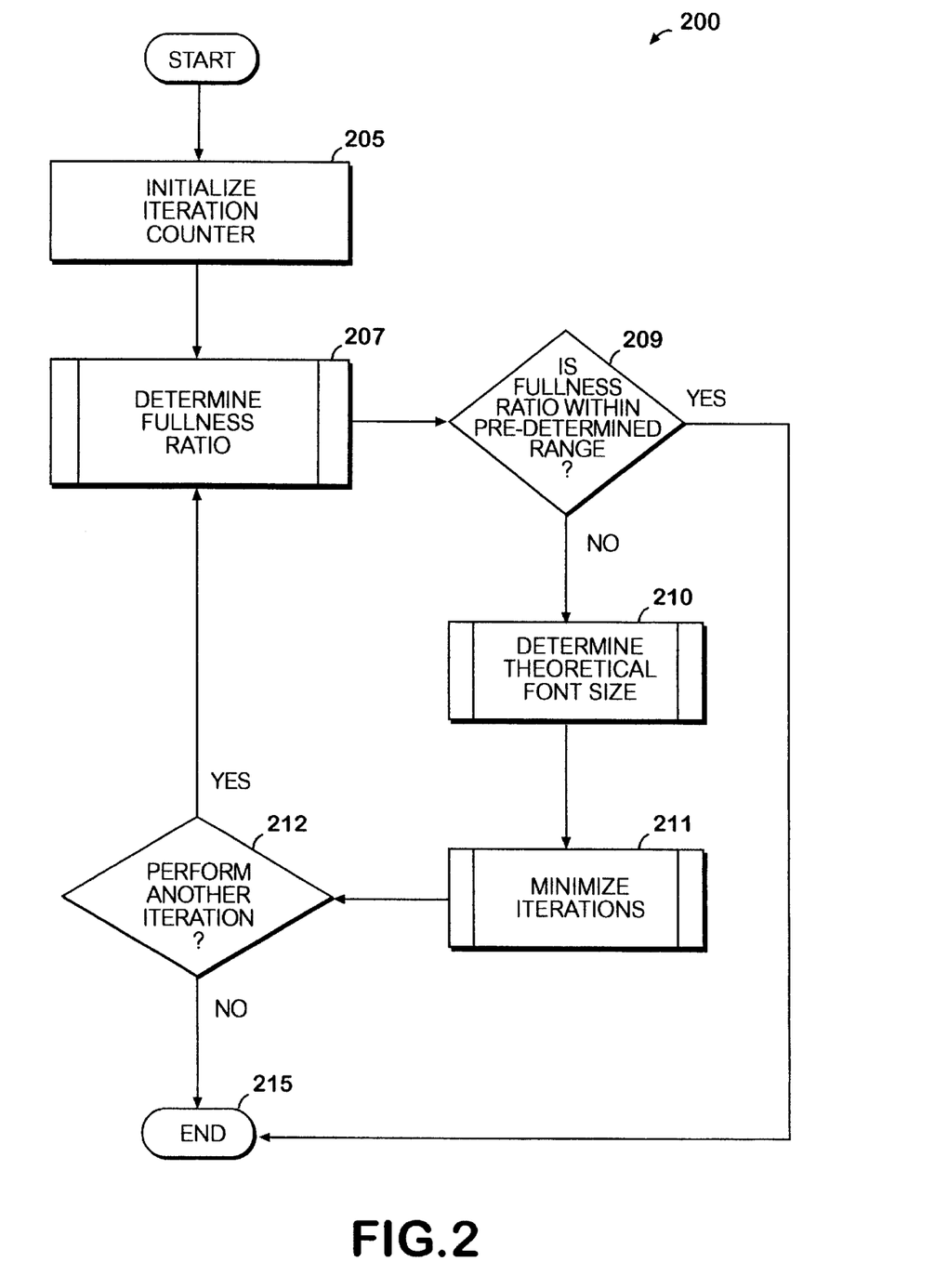
FIG. 2 is a logic flow diagram illustrating the operation of an exemplary embodiment of the invention.

The general operation of an exemplary embodiment of the invention is shown in the flow chart of FIG. 2. When the exemplary copy fitting loop is entered, the first operation that occurs is the initialization of a loop counter, otherwise known as an iteration counter 205. The iteration counter is not an essential element of the invention. Instead, as is often the case in systems that employ loops, the counter is used as a matter of convenience to help minimize the number of loops of the process that are carried out in arriving at a desired conclusion.

Next, a fullness ratio is calculated in step 207. The fullness ratio of the text frame is basically a ratio of the height of the editable text compared to the height of the text frame. Thus, a general method for calculating the fullness ratio may be described as dividing the amount of vertical space on the display screen occupied by the editable text, by the amount of vertical space on the display screen occupied by the text frame.

Alternatively, the fullness ratio may be thought of as the amount of vertical space within the text frame that is occupied by the editable text. Considering the fullness ratio in this context may be more precise because the thickness of the text frame border or margin is eliminated from consideration by considering only the height of the vertical space within the text frame. However, when determining the fullness ratio in this context, a straight forward calculation of the vertical space within the text frame that is occupied by the editable text may be inappropriate. Such a straight forward calculation may be inaccurately low in an overflow situation because the editable text may occupy the entire text frame.

Thus, to more accurately calculate the fullness ratio in this alternate context, a resize height of the text frame may be determined. The resize height of the text frame may be defined as the height that the text frame would have to be resized to, to fully enclose the editable text. The fullness ratio is then determined by dividing the resize height of the text frame by the height of the text frame. As mentioned, this alternate method for determining a fullness ratio may be more accurate than the general method described previously. However, both the general method and the alternate method yield satisfactory results in the context of the present invention.

As mentioned, the exemplary embodiment of the present invention is designed for use in a desktop publishing system that produces documents, which include text frames. For aesthetic reasons, it is typically desirable to maintain the original scale of the document, which means that the height of the text frames must also remain constant. Therefore, the exemplary embodiment of the present invention involves scaling the size of the editable text while the height of a text frame remains fixed. However, since the present copyfitting procedure is performed in a standard text editing environment, no restrictions are placed on the user's ability to modify the height of a text frame before or after the present copyfitting procedure is performed.

Figure 3:
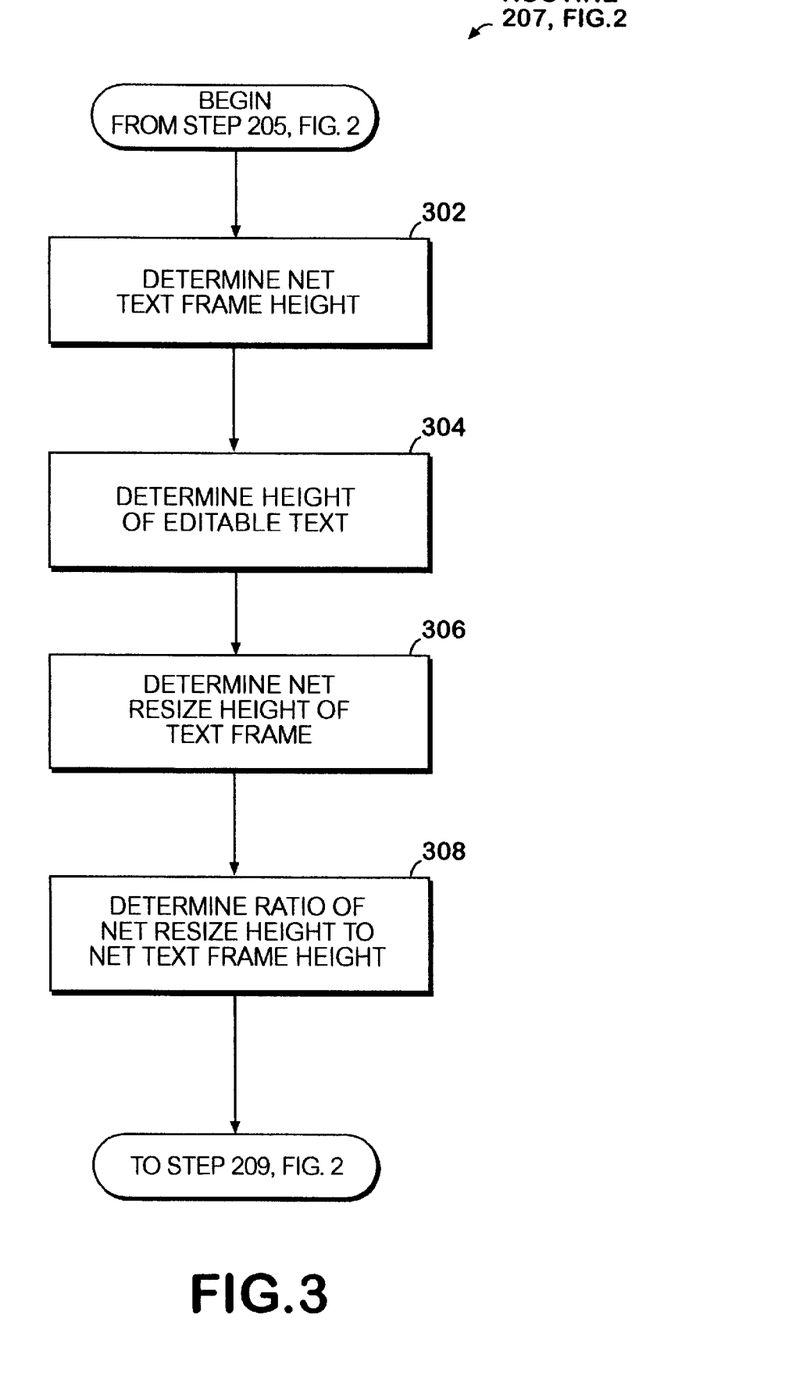
FIG. 3 is a logic flow diagram that provides details regarding an exemplary method for calculating a fullness ratio.

FIG. 3 provides details regarding an exemplary method for calculating a fullness ratio. In step 302 the net height of the text frame is calculated. This net height may be determined by the gross height, or total height, of the text frame less any vertical space reserved for top and/or bottom margins. Next, the height of the editable text is calculated in step 304. As previously stated, the height of the editable text is defined as the amount of vertical space occupied by the editable text. In step 306, the net resize height of the text frame is determined. The resize height is defined as the height to which the text frame would be resized, if it were to be enlarged or reduced to enclose the editable text without underflow or overflow. Thus, the net resize height is defined as the resize height less any space reserved for top and/or bottom margins. Lastly, the ratio of the net resize height compared to the net text frame height is found in step 308.

It is important to note that a fullness ratio may also be defined to be the ratio of the widths (or other appropriate dimension) of the editable text and the text frame, as opposed to the previously discussed ratio of heights. Width may be described as the amount of horizontal space occupied by the editable text and the text frame. Like vertical space, the term horizontal space is used in its commonly understood meaning with respect to a dimension from side to side of a computer screen. Thus, the system of the present invention supports editable text that is written in languages, such as Chinese, that form words or sentences vertically and gradually fill the text frame horizontally. When using width in place of height in calculating the full ratio, the vertical editable text is widened or constricted until it optimally fills the text frame. Furthermore, other modifications of this nature may occur to those skilled in the art, such as computing a fullness ratio based on both the horizontal and vertical space i.e., height and width, occupied by the editable text in the text frame. Also, support for bidirectional scripts such as Hebrew, where text can flow either right-to-left or left-to-right, may occur to those skilled in the art. All such modifications are contemplated as being within the scope of the present invention.

Referring again to FIG. 2, after the fullness ratio is calculated in step 207, a determination is made in step 209 as to whether the fullness ratio is ideal. As mentioned, any range of values defining an ideal fullness ratio may be coded into the system and/or selected by the user. However, it has been determined through experimentation that a range of 95%–100% fullness produces the most aesthetically pleasing results in the most reasonable amount of time. If the fullness ratio is determined to fall within the predetermined range, the exemplary method proceeds directly to step 215, where the copyfitting loop is ended. However, if the fullness ratio is determined in step 209 to fall outside the predetermined range, the exemplary method progresses to step 210.

In step 210 of FIG. 2, the calculation of a theoretical font size involves a "guess heuristic" to arrive at a font size that causes the editable text to substantially occupy the text frame without overflow. When a theoretical font size is determined that causes the editable text to substantially fill the text frame, the theoretical font size is said to be the ideal font size. The calculation of the theoretical font size is often counter-intuitive due to the fact that enlarging the font size of a block of editable text can lead to line wraps. A line wrap may be defined as a single line of editable text being split into two lines of editable text. A line wrap occurs when the size of the editable text becomes too large to fit on a single line. Thus, the process is described as a guess heuristic because the theoretical font size is typically calculated several times before the ideal font size is determined. Still, as will become apparent, the exemplary method of calculating the theoretical font size is specifically designed to minimize the number of calculations of the theoretical font size. Details of the theoretical font size calculation in the exemplary embodiment are provided below with reference to FIG. 4.

Figure 4:
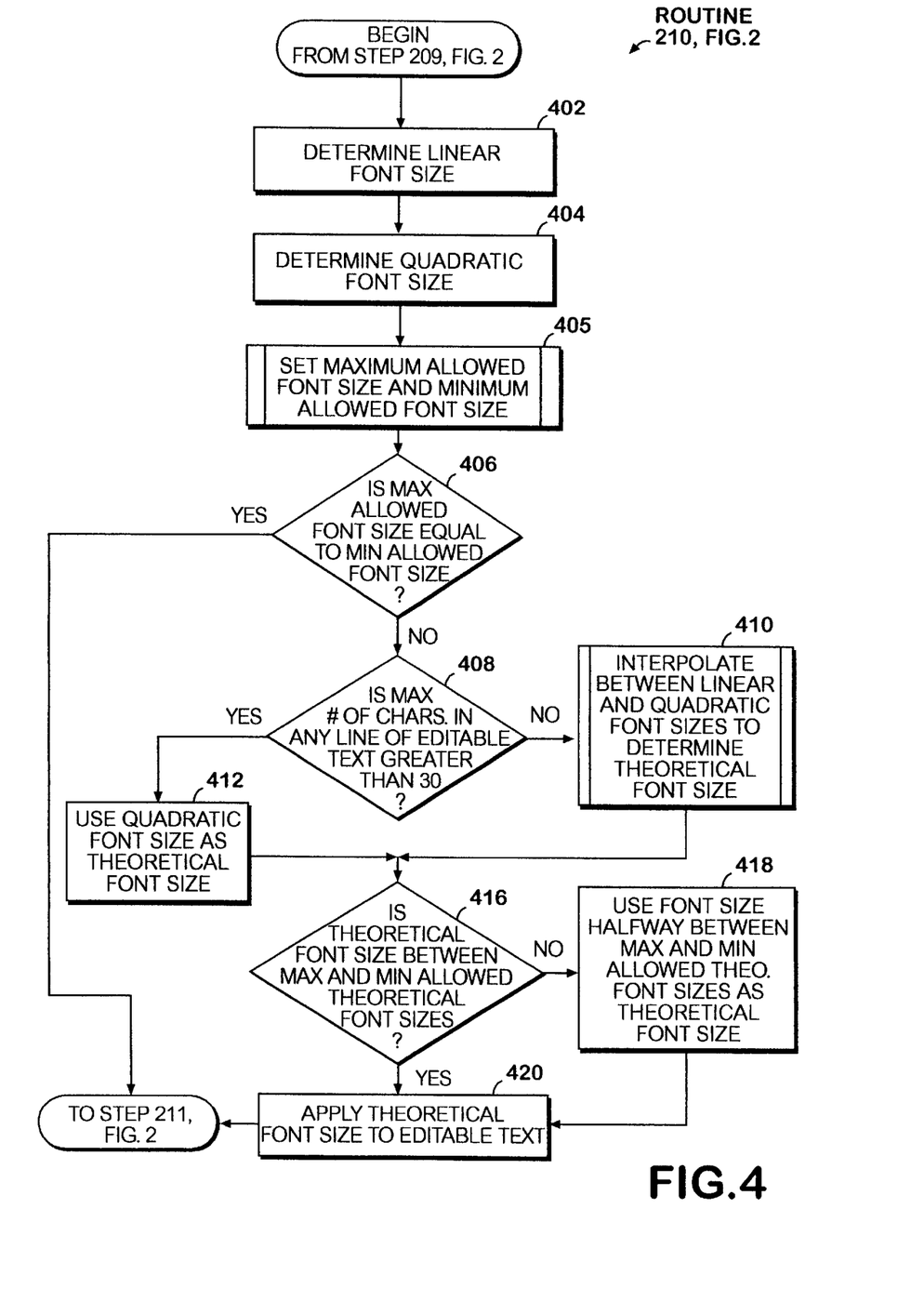
FIG. 4 is a logic flow diagram that provides details of the theoretical font size calculation of the exemplary embodiment.

In step 402 of FIG. 4, the calculation of the theoretical font size begins with the calculation of a linear font size. This linear font size is defined as the font size that results from linearly scaling the initial font size of the editable text based on the fullness ratio. The initial font size is the font size of the editable text as originally input into the text frame. To be more precise, the linear font size is calculated in the exemplary embodiment by first dividing the desired fullness ratio, typically 1.0 or 100%, by the fullness ratio (defined above in step 209, FIG. 2). This result is then multiplied by the font size of the editable text to determine the linear font size. For example, if a block of editable text, having a 10 point font size, were to vertically occupy 1 inch of a text frame having a height of 3 inches, the fullness ratio would be 0.33 or one third. If the desired fullness ratio is 1.0, the linear font size is found by multiplying the 10 point font size by 3.0.

It appears logical in the above example that scaling the initial font size of the editable text threefold, to 30 point, would cause the editable text to maximally fill the text frame. However, depending on the width of the editable text, determined by the maximum number of characters on any line of editable text, increasing the font size beyond a certain value causes the editable text to wrap to the next line. This line wrap has a significant effect on the fullness ratio of the text frame. For example, assume that only one line of editable text is involved in the above illustration, where the font size of the editable text was increased from 10 to 30 point. Assume also that if no line wraps were to occur, the 30 point editable text would have a resulting height of 3 inches, maximally filling the text frame. Yet, if even a single line wrap were to occur, meaning that the enlarged editable text would occupy two lines rather than one, the resulting height of the editable text would be about six inches and would obviously overflow the text frame. Thus, unless no line wraps occur, the linear font size may not be not a wise choice for the theoretical font size.

In an attempt to account for the problems caused by line wraps, a quadratic font size is calculated in step 404 of FIG. 4. This quadratic font size is based on the fact that the surface area of a character of editable text can be thought of as a rectangle. When the font size of the character is enlarged, both the height and width vary linearly with the font size. Thus, the surface area of a character varies quadratically with the size of the font. The width of the editable text is bounded by the width of the text frame. When the number of characters per line is large, it may be assumed that the percentage of each line that is filled with editable text remains constant or decreases as the font size is increased. Such an assumption is reasonable since larger fonts may result in more wasted space per line, i.e. the empty space between characters may be scaled proportionately. So, in a situation where the number of characters per line is large, changes in the surface area of the editable text may only be reflected by changes in height. Thus, for a large number of characters per line, the height of the editable text varies as the square of the font size.

In FIG. 4, step 404, the quadratic font size is calculated in three steps: (1) dividing the desired fullness ratio, defined by a predetermined range of values, by the fullness ratio (defined in step 209, FIG. 2) so as to arrive at a quotient; (2) taking the square root of that quotient so as to arrive at a result; and (3) multiplying the result by the font size of the editable text so as to arrive at the quadratic font size. The quadratic font size of the exemplary embodiment is an approximation of the largest font size which may be applied to editable text within a text frame while generally guaranteeing that the editable text does not overflow the text frame. Thus, the linear font size may be viewed as a best case theoretical font size, and the quadratic font size may be viewed as a worst case theoretical font size. Those skilled in the art will appreciate that the quadratic font size is an approximation based on reasonable assumptions, and that the relationship between the surface area of the editable text and the height of the text frame may actually be a function that is of a higher order than quadratic. Thus, the scope of the present invention is not limited to a worst case theoretical font size that is based on a quadratic function.

After calculation of the quadratic font size in step 404 of FIG. 4, the exemplary method proceeds to define an allowable range of font sizes for the theoretical font size. In particular, in step 405, the exemplary method sets a maximum allowed font size and a minimum allowed font size. If a theoretical font size is calculated that falls outside this range defined by the maximum and minimum allowed font sizes, the theoretical font size is rejected and another value is determined. As mentioned, the exemplary embodiment loops through calculations of a theoretical font size. After every iteration, the range between the maximum and minimum font sizes is decreased. By continually decreasing the range between the maximum allowed font size and the minimum allowed font size, the exemplary embodiment is able to determine the ideal font size fairly quickly.

As mentioned above, the linear font size represents the best case theoretical font size, i.e. assuming no line wraps. The linear font size is the largest font size that causes the editable text to maximally fill the text frame. For this reason, the maximum allowed font size is initially set equal to the linear font size. Any determined theoretical font sizes that are larger than the linear font size are rejected. Likewise, the quadratic font size assumes many line wraps and represents the worst case theoretical font size. Thus, the minimum allowed font size is initially set equal to the quadratic font size.

Figure 5:
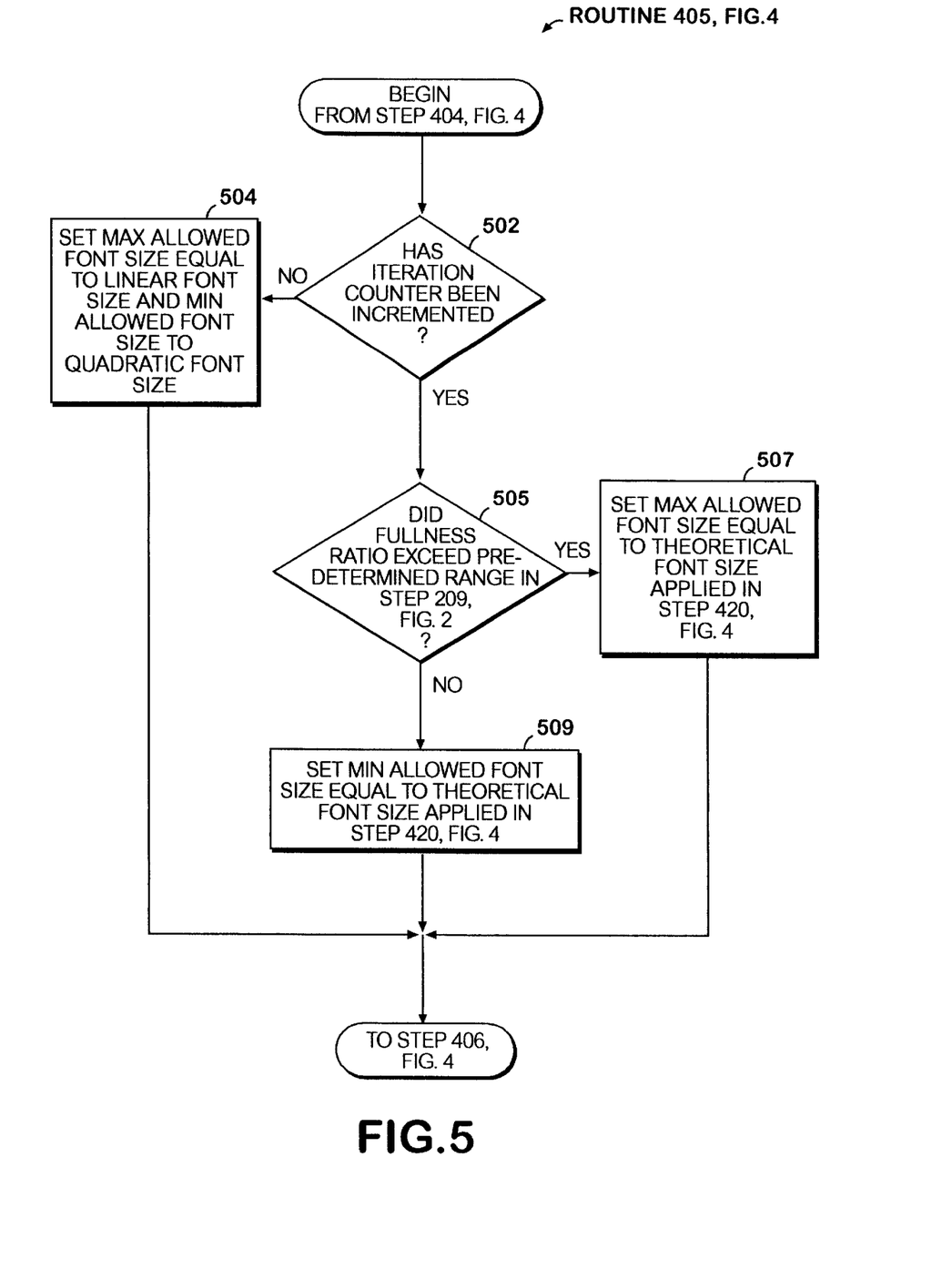
FIG. 5 is a logic flow diagram that provides details regarding the exemplary method of assigning a value to a maximum allowed font size and to a minimum allowed font size.

FIG. 5 provides details regarding the exemplary method of assigning a value to the maximum allowed font size and to the minimum allowed font size. In step 502, the iteration counter is checked to determine whether the iteration counter has been incremented. Generally, this step constitutes a check of whether the exemplary method is in the initial iteration through the copyfitting loop. If so, the iteration counter will not have been incremented and the exemplary method progresses to step 504. In step 504, the maximum allowed font size is set equal to the linear font size and the minimum allowed font size is set equal to the quadratic font size.

In subsequent iterations through the copyfitting loop, it is desirable to narrow the range of values between the maximum allowed font size and the minimum allowed font size. This narrowing may occur by adjusting those values according to the fullness ratio determined in the immediately preceding iteration. Thus, when the counter has been incremented, the exemplary method moves from step 502 to step 505. In that step, a determination is made as to whether the fullness ratio previously calculated in step 209 (FIG. 2) exceeded the predetermined range of values, which is 0.95–1.0 in the exemplary embodiment. Thus, in step 507, if the fullness ratio exceeds the predetermined range of values, the maximum allowed font size is set equal to the theoretical font size which was applied to the editable text in step 420 (FIG. 4). Thus, if a theoretical font size was determined to be too large in a previous iteration, all subsequent iterations preferably involve a smaller theoretical font size. Of course, in the exemplary embodiment, the subsequent smaller theoretical font sizes are subject to the limit set by the minimum allowed font size.

Note from FIG. 2, that if the fullness ratio had been within the predetermined range of values, the exemplary method would have proceeded from step 209 to step 215, where the method is terminated. So, if in step 505 it is determined that the fullness ratio previously determined in step 209 (FIG. 2) did not exceed the predetermined range of values, that fullness ratio must have been less than the predetermined range of values. When the previously determined fullness ratio is less than the predetermined range of values, the exemplary method progresses to step 509, where the minimum allowed font size is set equal to the previously applied theoretical font size.

Those skilled in the art will understand that alternative methods exist for determining an ideal font size that lies somewhere between two theoretical font sizes. For example, a binary search would eventually yield substantially the same result as the exemplary method However, it has been determined that the exemplary method of the present invention is able to produce the desired result in much less time than would be required by a binary search. Still, the scope of the present invention is intended to include all well known methods for searching for a particular value that lies between two given values.

Referring again to FIG. 4, after the maximum and minimum allowed font sizes are set in step 405, the exemplary method progresses to step 406, where it is determined whether the range between the maximum allowed font size and the minimum allowed font size has been narrowed to zero or substantially zero. In such a situation, the minimum allowed font size is substantially equal to the maximum allowed font size. The exemplary method is unable to further determine a theoretical font size that allows the editable text to substantially occupy the text frame. Therefore, the exemplary method proceeds to step 710 (FIG. 7), via steps 211 (FIG. 2) and 701 (FIG. 7), where an instruction is received to not perform another iteration.

If the range between the maximum and minimum allowed font sizes has not been narrowed to zero or substantially zero, the exemplary method progresses from step 406 to step 408 (FIG. 4), where a determination is made as to whether any particular line of editable text in the text frame exceeds thirty characters in length. The exemplary embodiment uses 30 characters, but those skilled in the art will recognize that other measurements would work for other applications of the method. As mentioned above, with reference to steps 402 and 404, the exemplary method calculates a linear font size and a quadratic font size. Assuming no line wraps, the linear font size is the largest font size that causes the editable text to substantially occupy the text frame, without overflow. Through experimentation it has been determined that the linear font size, when applied to the editable text, will almost always result in overflow, unless the number of characters in all lines of editable text is near zero.

It has also been determined that for a block of editable text having fewer than thirty characters per line, the quadratic font size typically results in underflow. So, when the number of characters on any line of all the lines of editable text is less than a threshold value of thirty, the ideal font size that allows the editable text to substantially fill the text frame without overflow generally lies somewhere between the linear and quadratic font sizes. As such, if the number of characters in any line of all of the lines of editable text in the text frame is determined in step 408 to be fewer than thirty, the exemplary method proceeds to step 410, where the theoretical font size is calculated by interpolating between the linear font size and the quadratic font size. See FIG. 6 and the discussion thereof that follows below. On the other hand, if the maximum number of characters in any line of editable text is greater than or equal to thirty, the exemplary method moves from step 408 to step 412, where the quadratic font size is used as the theoretical font size.

The thirty character threshold defined above is only meant to be an approximation of when line wrap is likely to occur. Those skilled in the art will appreciate that the threshold may be set to another number as appropriate. Thus, the scope of the present invention is not limited to a threshold of thirty characters. Furthermore, those skilled in the art will appreciate that the thirty character threshold is advantageously incorporated into the exemplary embodiment of the present invention so as to allow the ideal font size to be determined more speedily. Therefore, while a system without such a threshold may be slower, it is not intended that the scope of the present invention be limited to a system or method incorporating a thirty character threshold.

Figure 6:
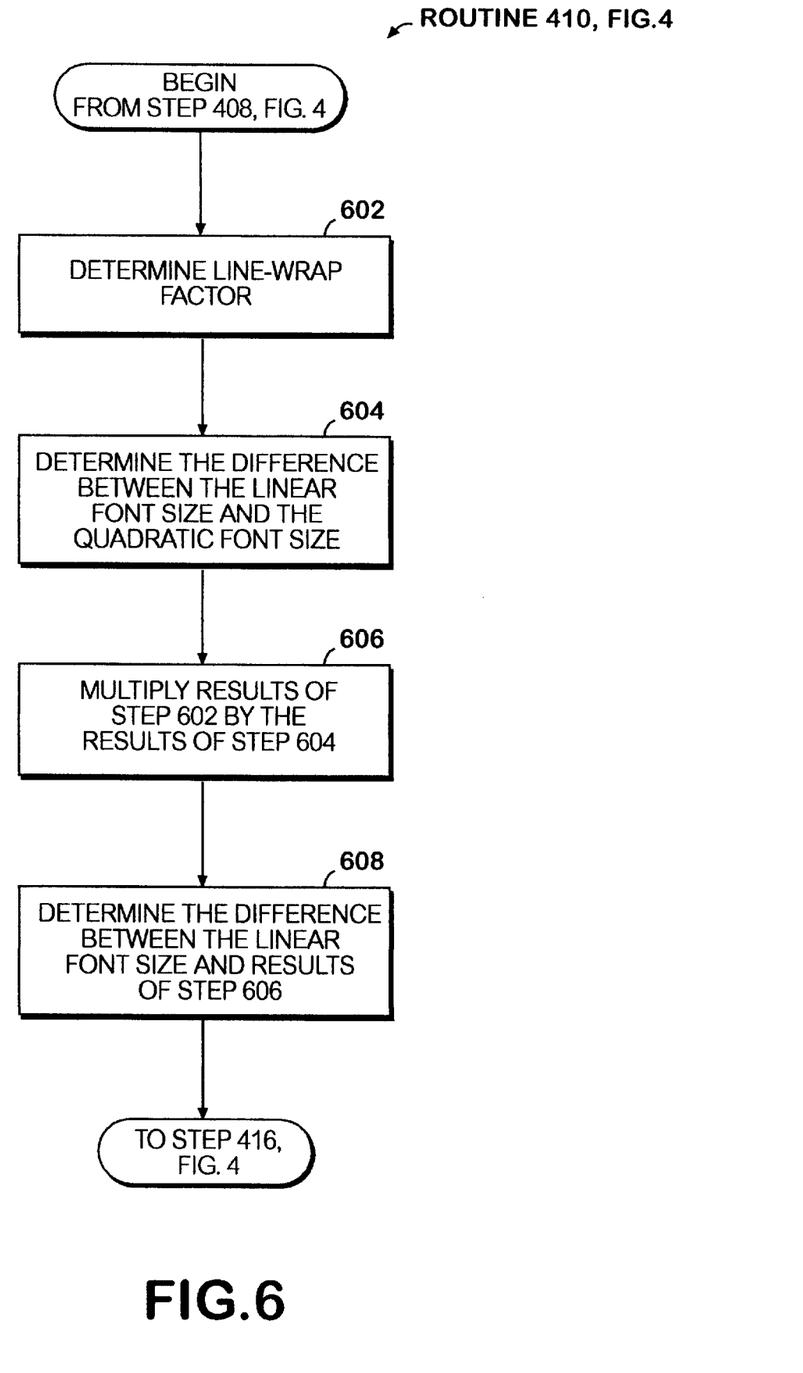
FIG. 6 is a logic flow diagram that illustrates an exemplary method for interpolating between a linear font size and a quadratic font size to find an interpolated font size.

The terms "interpolate", "interpolation", and "interpolating", as used herein, refer to an operation for determining a font size that lies somewhere between the linear font size and the quadratic font size. Those skilled in the art will appreciate that many methods exist for interpolating between values. All such methods of interpolation are contemplated as being applicable to the present invention. FIG. 6 illustrates an exemplary method 410 for interpolating between the linear font size and the quadratic font size to find an interpolated font size. In step 602, the exemplary method first calculates what is referred to as a line-wrap factor. The line wrap factor is an approximation of the likelihood that the editable text will wrap to another line when the font size is increased. In the exemplary embodiment, the line wrap factor is based on the thirty character threshold discussed above with reference to step 408, FIG. 4. The line wrap factor is determined by finding the line of editable text that has the most characters of any of the lines of editable text and then determining the number of characters in that line. The number of characters in that line is further referred to as the maximum number of characters. This maximum number of characters is divided by thirty, the value of the above-described threshold. For example, assume the editable text within the text frame consists of a plurality of lines of text. Assume also that the line with the maximum number of characters has twenty characters. Then, the line wrap factor is $20/30$, or 0.67.

In the exemplary embodiment, when any line of editable text within the text frame contains more than thirty characters, the quadratic font size is used to closely approximate the ideal font size. Thus, when the number of characters on any line of editable text approaches but does not exceed thirty, the theoretical font size should be near in size to the quadratic font size. When the number of characters on each of the lines of the editable text is near zero, the theoretical font size should more closely resemble the linear font size. Thus, the line wrap factor is used in interpolating between the linear font size and the quadratic font size so that the interpolated font size is a close approximation of the ideal font size.

The difference of the linear font size and the quadratic font size is determined in step 604. That difference is multiplied by the line wrap factor in step 606 to arrive at a product. Finally, in step 608 the product calculated in step 606 is subtracted from the linear font size to achieve a result. The result of the calculation in step 608 is the interpolated font size given by the exemplary interpolation between the linear font size and the quadratic font size. This interpolated font size is then used as the theoretical font size. Those skilled in the art will appreciate that alternate methods of interpolation may yield a similar result. For example, the line wrap factor of the exemplary embodiment may be calculated in a distinct fashion or may be omitted entirely. The theoretical font size may be calculated as the font size that is mid-way between the linear font size and the quadratic font size. Further, it will be understood from the above discussion that the exemplary interpolation method is designed to enable the system to efficiently determine the ideal font size that is to be applied to the editable text in the text frame. Still, the present invention will function adequately, if no interpolation is performed and the linear font size is simply used as the theoretical font size when there is a small amount of characters per line of editable text.

Referring again to FIG. 4, whether the quadratic font size was used as the theoretical font size, or the theoretical font size was determined by interpolating between the linear and quadratic font sizes in step 410, the exemplary method next moves to step 416. In step 416, the system determines whether the calculated theoretical font size falls within the range of font sizes defined by the minimum allowed font size and the maximum allowed font size. Note that in the first iteration through the loop, the maximum and minimum allowed font sizes are set equal to the linear and quadratic font sizes, respectively, in step 405 prior to calculation of the theoretical font size in step 412 or step 410. Thus, the first time the system encounters step 416, the theoretical font size necessarily falls within the range defined by the minimum and maximum allowed font sizes.

However, once a theoretical font size is determined and the exemplary method iterates through the loop again, either the minimum allowed font size or the maximum allowed font size is adjusted. Thus, the next time the exemplary method reaches step 416, the allowed range of values for the theoretical font size is narrowed. Due to line wraps, the theoretical font size may in fact lie outside the range defined by the minimum and maximum allowed font sizes. In such a case, the guess heuristic logic may break down. In the interest of conserving time, the exemplary method calculates another theoretical font size, using a different method, that is guaranteed to be within the range defined by the maximum and minimum allowed font sizes. Thus, the exemplary method advances to step 418, where a simple, yet effective, binary search is performed between the maximum and minimum allowed font sizes to determine the theoretical font size.

When a theoretical font size is determined that is within the range defined by the maximum and minimum allowed font sizes, the exemplary method proceeds to step 420, where the theoretical font size is applied to the editable text by changing the initial font size of the editable text to the theoretical font size. Those skilled in the art will appreciate that displaying the changes to the font size on the user's display screen after every iteration will cause the determination of the ideal font size to be slower than if the changes were not displayed on the display screen. Thus, in the exemplary embodiment, changes to the font size are done through the memory of the computer and are not displayed to the user until the ideal font size is determined.

The exemplary method is now ready to reiterate through the copyfitting loop, recalculating the fullness ratio based on the height of the editable text when the theoretical font size is applied thereto, and determining whether the theoretical font size is the ideal font size that is to be applied to the editable text on the user's display screen. However, referring back to FIG. 2, it may be seen that the exemplary embodiment performs an additional procedure for minimizing loop iterations, in step 211, before the next iteration through the copyfitting loop is initiated.

Figure 7:
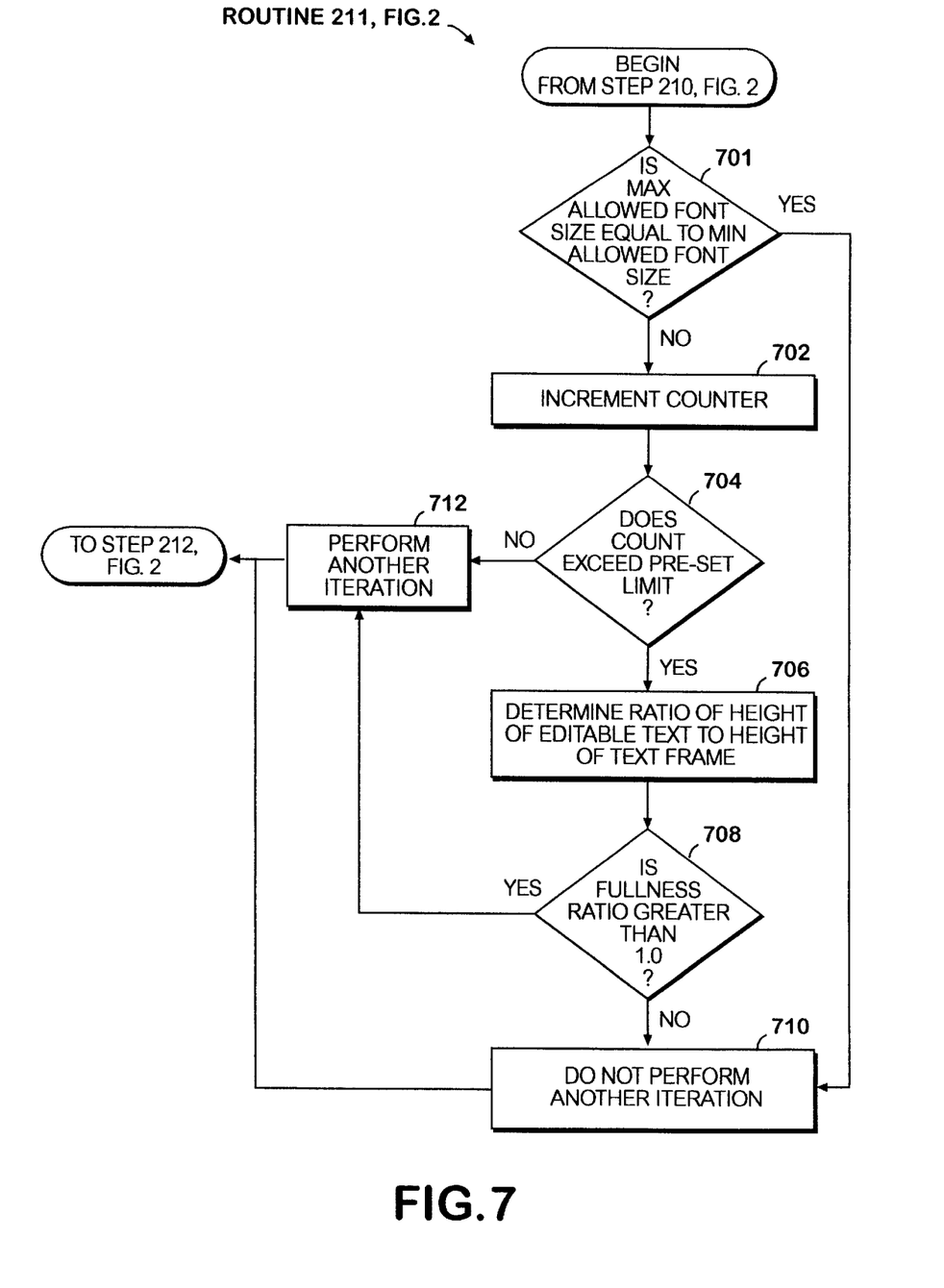
FIG. 7 is a logic flow diagram illustrating procedures for minimizing iterations through the method of the exemplary embodiment.

FIG. 7 details the steps involved in the iteration minimization procedure of step 211. Initially, if the range between the maximum allowed font size and the minimum allowed font size has been reduced to zero or substantially to zero (step 406, FIG. 4), the system advances from step 701 to step 710. In step 710 an instruction not to perform another iteration is received. If the range between the maximum allowed font size and the minimum allowed font has not been reduced to zero or substantially to zero, the exemplary method moves to step 702. Each time the exemplary method progresses to step 702, the iteration counter is incremented. In step 704, a determination is made as to whether the iteration count exceeds a pre-set limit. In the exemplary embodiment, the pre-set limit is used to ensure that the guess heuristic process outperforms a binary search.

In the exemplary embodiment, a value of ten iterations is used as the pre-set limit due to the fact that typical desktop publishing applications, into which the present invention is most likely to be incorporated, support font sizes from 0.1 points to over 999.9 points. A point is 1/72 of a standard inch. This range in font sizes translates into nearly 10,000 possible font sizes, which would take on the order of fourteen iterations to traverse using a binary search (10,000 can be rounded off to $2^{14}$). The guess heuristic employed in the exemplary embodiment of the present invention usually allows the exemplary method to calculate the ideal font size in one or two guesses. However, at the very least, restricting the iterations to a count of ten will virtually ensure that the guess heuristic arrives at the ideal font size in much less time than would a binary search.

Referring again to FIG. 7, step 704, if the iteration count does not exceed the pre-set limit, the exemplary embodiment advances to step 712, where the exemplary method performs another iteration through the copy fitting loop of the present invention. On the other hand, if the iteration count exceeds the pre-set limit, the fullness ratio is recalculated in step 706 so that a determination may be made in step 708 as to whether the editable text overflows the text frame. If the editable text does not overflow the text frame, in step 710 the copyfitting loop is exited. If the editable text overflows the text frame, the copyfitting loop is iterated through once more, or until overflow does not occur.

It will be understood by those skilled in the art that the iteration minimization procedures employed in the exemplary embodiment of the present invention are included to so as to optimize the speed, efficiency, and performance of the method and system. However, these iteration procedures are not contemplated as being essential elements of the present invention. Therefore, the scope of the present invention should not be perceived as being limited in any way by the disclosure of these optimization features.

Referring once again to FIG. 2, the exemplary method progresses from step 211 to step 212, where the exemplary method will either continue through the copy fitting loop, or exit the loop, as instructed. If the exemplary method has been instructed to exit the copy fitting loop, the exemplary method progresses to step 215, where the loop is terminated. After termination of the copyfitting loop, any changes made to the initial font size of the characters of the editable text must be displayed on the display screen. Obviously, however, if the initial font size of the input editable text is determined to be the ideal font size, no changes will be required on-screen.

The above description of an exemplary embodiment of the present invention is meant to be illustrative of the basic functionality of the present invention and a few exemplary optimization features. Those skilled in the art will appreciate that other advantageous features may be incorporated into the methods and system. For example, the exemplary embodiment is contemplated as being capable of simultaneously managing copyfitting for several text frames. In this situation, the system may provide that the copyfitting process be automatically triggered by designated conditions. Such conditions may include: when a certain text frame is selected for copyfitting; when overflow occurs in any text frame the system may include; when formatting, such as border thickness, is applied to a text frame; when a text frame is relocated or resized; when editable text is deleted from a text frame; when the format of the editable text is altered by the user so as to affect the size of the editable text, for example changing font or style; when operations are performed that can affect the size of text frames, such as changing mail merge records or updating date/time fields. Through use of the of triggering conditions, copyfitting activity may be restricted to situations in which it is likely that the results of a previous copyfitting operation will be invalidated. In this manner, computer resources, such as memory and CPU cycle time may be advantageously conserved.

It is also contemplated that another embodiment of the present invention include a feature to detect word breaks. In some instances, a line wrap may cause a lengthy word to be hyphenated and split between two lines. Furthermore, in some languages, for example Swedish, extra letters are added to hyphenated words. To account for these situations, an embodiment of the present invention may include a check box, pull-down table or other well-known selection means to allow the method and system to reject unnatural word wraps, or to accept them and add a hyphen and/or extra characters. Rejecting word breaks typically causes the editable text to remain small enough so that no lengthy words are split between two lines. In other words, the fullness ratio of the editable text compared to the text frame will not be ideal. However, such a consequence may be preferable to unnatural word breaks in many cases.

As described above, the exemplary embodiment of the present invention provides a method and system to increase or decrease the font size of editable text based on the height of a text frame. In an alternate embodiment, it may be desirable to limit the operability of the system to only decreasing the font size of the editable text. Such a modification may trivially be accomplished by setting the maximum allowed font size equal to the initial font size.

In conclusion, the present invention provides a system and method for automated copyfitting, so as to optimally fit editable text into a text frame of a given size. The present invention operates in a standard, rich formatting text editing environment of a text editing application. The exemplary embodiment changes the font size of the characters that make up the editable text, so as to change the height of the editable text, without departing from the standard editing environment. The exemplary embodiment of the present invention causes the height of the editable text to be altered in response to the editable text being input into the text frame. Thus, there is no need for user interaction to affect the change in the height of the editable text. Further, those skilled in the art will appreciate that the present invention may be used to manipulate other properties of the text, such as line height and character width.

The exemplary embodiment of the present invention loops through calculations of a fullness ratio and a theoretical font size to determine an ideal font size such that the editable text will substantially occupy an associated text frame. The fullness ratio is calculated as the resize height of the text frame, defined as the height of the text frame which would be required to make the editable text just fit, divided by the actual height of the text frame. Based on the fullness ratio of the text frame, a theoretical font size is calculated. The theoretical font size may be described as a best guess at the ideal font size. In an attempt to determine a theoretical font size that closely approximates the ideal font size, a linear font size is first calculated using a linear equation. However, due to line wraps, resizing the editable text to this linear font size may actually cause the editable text to overflow the text frame. Thus, a quadratic font size is calculated using a quadratic equation. The ideal font size that allows the editable text to substantially occupy the text frame without overflow generally lies somewhere between the linear and quadratic font sizes, which are used as initial maximum and minimum allowed font sizes, respectively.

If there are more than thirty characters on any line of all lines of the editable text, the theoretical font size is set equal to the quadratic font size. If there are fewer than thirty characters on each of all of the lines of editable text, the theoretical font size is calculated by interpolating between the linear font size and the quadratic font size. The fullness ratio of the text frame is then recalculated based on the theoretical font size. If the fullness ratio does not fall within a predetermined range of values, the copyfitting loop is repeated until the ideal font size is determined.

After each incorrect determination of a theoretical font size, the maximum and minimum allowed font sizes are reset, so that the system can quickly determine the ideal font size. For example, if the theoretical font size is smaller than the maximum allowed font size, but still results in overflow, the theoretical font size becomes the new maximum allowed font size and no subsequent theoretical font sizes larger than the new maximum value are accepted. If a subsequent theoretical font size falls outside the range defined by the maximum and minimum allowed font sizes, the theoretical font size is simply replaced by a halfway font size that is halfway between the maximum and minimum allowed font sizes, and the copy fitting loop is terminated. Also, for theoretical font sizes that fall within the range defined by the maximum and minimum allowed font sizes, the copy fitting loop includes additional time conserving features. As an example, the loop includes an iteration counter having a preset limit. When the preset limit on the number of loop iterations is exceeded, the next theoretical font size that does not result in overflow is assumed to be the ideal font size and the loop is terminated.

In view of the foregoing, it will be appreciated that the invention provides a method and system for causing editable text to substantially occupy a text frame without the need for user interaction. The exemplary embodiments of the method and system cause the height of the editable text to be changed, while the editable text is displayed in a standard text editing environment of a text editing application. It should be understood that the foregoing relates only to the exemplary embodiments of the present invention, and that numerous changes may be made thereto without departing from the spirit and scope of the invention as defined by the following claims.

What is claimed is:

1. A computer system for causing editable text to substantially occupy a text frame, comprising:

a central processing unit (CPU);

a display device functionally coupled to the CPU, the display device being operative for displaying a text frame and editable text associated with the text frame, the editable text comprising a plurality of characters and having an initial dimension and initial font size;

an input device functionally coupled to the CPU, the input device operable to input the editable text into the text frame; and the CPU, responsive to the input of the editable text, operable for:

determining a fixed dimension of the text frame, dynamically calculating an ideal dimension of the editable text, the ideal dimension being within a predetermined range of percentages of the fixed dimension of the text frame, comprising;

determining a theoretical font size for the characters;

changing the initial font size of the characters to the theoretical font size;

determining a theoretical dimension for the editable text after the initial font size of the characters is changed to the theoretical font size;

determining a theoretical fullness ratio;

determining that the theoretical fullness ratio is within the predetermined range of values; and in response to the theoretical fullness ratio being within the predetermined range of values, using the theoretical dimension as the ideal dimension, and changing the initial dimension of the editable text to the ideal dimension, so as to cause the editable text to substantially occupy the text frame.

2. The system of claim 1, wherein the initial dimension comprises an initial height;

wherein the ideal dimension comprises an ideal height; and wherein the fixed dimension comprises a fixed height.

3. The system of claim 1, wherein the initial dimension comprises an initial width;
wherein the ideal dimension comprises an ideal width; and
wherein the fixed dimension comprises a fixed width.

4. The system of claim 1, wherein the initial dimension of the editable text is defined by an initial font size;
wherein the ideal dimension is defined by an ideal font size; and
wherein the CPU changes the initial dimension of the editable text to the ideal dimension by changing the initial font size to the ideal font size.

5. The system of claim 1, wherein the the theoretical fullness ratio comprises a ratio of the theoretical dimension of the editable text compared to the fixed dimension of the text frame.

6. The system of claim 1, wherein, prior to determining the theoretical font size for the characters, the CPU dynamically calculates the ideal dimension of the editable text by:
determining an initial fullness ratio, the initial fullness ratio being a ratio of the initial dimension of the editable text compared to the fixed dimension of the text frame; and
making an initial determination that the initial fullness ratio is not within a predetermined range of values.

7. The system of claim 5, wherein the initial dimension comprises an initial height;
wherein the ideal dimension comprises an ideal eight;
wherein the fixed dimension comprises a fixed height; and
wherein the theoretical dimension comprises a theoretical height.

8. The system of claim 5, wherein the initial dimension comprises an initial width;
wherein the ideal dimension comprises an ideal width;
wherein the fixed dimension comprises a fixed width; and
wherein the theoretical dimension comprises a theoretical width.

9. In a computer system operable to execute a text editing application, a method for causing editable text to substantially occupy a text frame, comprising:
receiving editable text for display in association with a text frame, the editable text comprising a character and having an initial dimension;
in response to receipt of the editable text, determining a fixed dimension of the text frame,
in response to determining the fixed dimension of the text frame, dynamically calculating an ideal dimension of the editable text, the ideal dimension being within a predetermined range of percentages of the fixed dimension of the text frame, comprising;
determining an initial fullness ratio;
making an initial determination that the initial fullness ratio is not within the predetermined range of values;
in response to the initial determination, calculating a theoretical font size for the characters;
changing the initial font size of the characters to the theoretical font size;
determining a theoretical dimension for the editable text after the initial font size of the characters is changed to the theoretical font size;
calculating a theoretical fullness ratio;
determining that the theoretical fullness ratio is within the predetermined range of values; and
in response to the theoretical fullness ratio being within the predetermined range of values, using the theoretical dimension as the ideal dimension; and
changing the initial dimension of the editable text to the ideal dimension, so as to cause the editable text to substantially occupy the text frame.

10. The method of claim 9, wherein the initial dimension comprises an initial height;
wherein the ideal dimension comprises an ideal height; and
wherein the fixed dimension comprises a fixed height.

11. The method of claim 9, wherein the initial dimension comprises an initial width;
wherein the ideal dimension comprises an ideal width; and
wherein the fixed dimension comprises a fixed width.

12. The method of claim 9, wherein the initial dimension of the editable text is defined by an initial font size;
wherein the ideal dimension is defined by an ideal font size; and
wherein changing the initial dimension of the editable text to the ideal dimension comprises changing the initial font size to the ideal font size.

13. A computer readable medium having stored thereon computer-executable instructions for performing the steps recited in claim 9.

14. The method of claim 9, wherein the initial fullness ratio comprises a ratio of the initial dimension of the editable text compared to the fixed dimension of the text frame.

15. The method of claim 14, wherein the initial dimension comprises an initial height;
wherein the ideal dimension comprises an ideal height;
wherein the fixed dimension comprises a fixed height; and
wherein the theoretical dimension comprises a theoretical height.

16. The method of claim 14, wherein the initial dimension comprises an initial width;
wherein the ideal dimension comprises an ideal width;
wherein the fixed dimension comprises a fixed width; and
wherein the theoretical dimension comprises a theoretical width.

17. A computer readable medium having stored thereon computer-executable instructions for performing the steps recited in claim 14.

18. In a computer system operable to execute a text editing application, a method for altering editable text in a text editing environment of the text editing application in order to cause the editable text to substantially occupy a text frame associated with the editable text, the editable text having an initial dimension and comprising a character having an initial font size, and the text frame having a fixed dimension, the method comprising:
determining a theoretical font size for the character comprising the editable text;
changing the initial font size of the character to the theoretical font size;
determining a theoretical dimension for the editable text after the initial font size of the character is changed to the theoretical font size;
determining a theoretical fullness ratio, the theoretical fullness ratio being a ratio of the theoretical dimension compared to the fixed dimension of the text frame; and
determining that the theoretical fullness ratio is within the predetermined range of values.

19. The method of claim 18, further comprising:
prior to determining the theoretical font size for the character, determining an initial fullness ratio, the initial fullness ratio being a ratio of the initial dimension of the editable text compared to the fixed dimension of the text frame; and making an initial determination that the initial fullness ratio is not within a predetermined range of values.

20. The method of claim 18, wherein the initial dimension comprises an initial height;

wherein the fixed dimension comprises a fixed height; and wherein the theoretical dimension comprises a theoretical height.

21. The method of claim 18, wherein the initial dimension comprises an initial width;

wherein the fixed dimension comprises a fixed width; and wherein the theoretical dimension comprises a theoretical width.

22. The method of claim 19, wherein determining the theoretical font size for the character comprises:

quadratically determining a quadratic font size for the character based on a mathematical square root of the initial fullness ratio; and using the quadratic font size as the theoretical font size.

23. The method of claim 22, wherein determining the theoretical font size for the character further comprises the steps of:

setting a maximum allowed font size for the character;

setting a minimum allowed font size for the character;

determining that the quadratic font size is not within a range defined by the maximum allowed font size and the minimum allowed font size; and instead of using the quadratic font size as the theoretical font size, using a halfway font size as the theoretical font size, the halfway font size being substantially halfway between the maximum allowed font size and the minimum allowed font size.

24. The method of claim 19, wherein determining a theoretical font size for the character comprises:

quadratically determining a quadratic font size for the character based on a mathematical square root of the initial fullness ratio;

linearly determining a linear font size for the character based on the initial fullness ratio;

interpolating between the linear font size and the quadratic font size to determine an interpolated font size; and using the interpolated font size as the theoretical font size.

25. The method of claim 24, wherein determining the theoretical font size for the character further comprises:

setting a maximum allowed font size for the character;

setting a minimum allowed font size for the character;

determining that the interpolated font size is not within a range defined by the maximum allowed font size and the minimum allowed font size; and instead of using the interpolated font size as the theoretical font size, using a halfway font size as the theoretical font size, the halfway font size being substantially halfway between the maximum allowed font size and the minimum allowed font size as the theoretical font size.

26. A computer readable medium having stored thereon computer-executable instructions for performing the steps recited in claim 18.

* * * * *